US011915576B2

United States Patent
(12) Ji et al.

(10) Patent No.: US 11,915,576 B2
(45) **Date of Patent: *Feb. 27, 2024**

(54) METHODS AND SYSTEMS FOR MANAGING EXECUTION OF STANDARD OPERATING PROCEDURES BY AN OPERATOR TO ADDRESS ALARMS GENERATED BY A FACILITY MANAGEMENT SYSTEM

(71) Applicant: Honeywell International Inc., Charlotte, NC (US)

(72) Inventors: Fujuan Ji, Shanghai (CN); Dongyun Liu, Shanghai (CN); George Green, Leesburg, VA (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/991,470

(22) Filed: Nov. 21, 2022

(65) Prior Publication Data

US 2023/0103657 A1 Apr. 6, 2023

Related U.S. Application Data

(63) Continuation of application No. 17/382,714, filed on Jul. 22, 2021, now Pat. No. 11,527,145, which is a (Continued)

(51) Int. Cl.
*G08B 25/00* (2006.01)
*G08B 29/18* (2006.01)

(52) U.S. Cl.
CPC ......... *G08B 25/001* (2013.01); *G08B 25/002* (2013.01); *G08B 29/185* (2013.01)

(58) Field of Classification Search
CPC .. G08B 25/001; G08B 25/002; G08B 29/185; G08B 29/02; G08B 29/18
See application file for complete search history.

(56) References Cited

U.S. PATENT DOCUMENTS 5,353,316 A 10/1994 Scarola et al.
5,696,486 A 12/1997 Poliquin et al.
(Continued)

OTHER PUBLICATIONS

"ComfortPoint Open," Honeywell, 15 pages, Mar. 2017.
(Continued)

*Primary Examiner* — John A Tweel, Jr.
(74) *Attorney, Agent, or Firm* — Seager, Tufte & Wickhem, LLP

(57) ABSTRACT

A computer assisted facility monitoring method provides users with predefined operating procedures that are recommended for addressing one or more alarms acknowledged by the user. The predefined operating procedures are created and stored prior to the occurrence of the alarms. In some examples, after acknowledging an alarm occurrence, the user may be provided with an option for bypassing or disregarding the alarm, as some such acknowledgements may have been for false alarms. In some examples, the predefined operating procedure may specify multiple action steps for addressing an alarm. In such examples, the user can close out or settle an alarm incident even without completing all of the action steps, provided the user enters a valid reason for doing so. In some examples, a user can batch-select a group of alarms, wherein perhaps only some of the acknowledged alarms in the group have corresponding predefined operating procedures.

20 Claims, 8 Drawing Sheets

Related U.S. Application Data continuation of application No. 16/888,352, filed on May 29, 2020, now Pat. No. 11,087,611.

(56) References Cited

U.S. PATENT DOCUMENTS

| | | | | |
|---|---|---|---|---|
| 6,373,383 | B1 | 4/2002 | Arrowsmith et al. | |
| 6,603,396 | B2 | 8/2003 | Lewis et al. | |
| 6,907,300 | B2 | 6/2005 | O'Mahoney et al. | |
| 7,010,450 | B2 | 3/2006 | Law et al. | |
| 7,113,085 | B2 | 9/2006 | Havekost | |
| 7,237,109 | B2 | 6/2007 | Scott et al. | |
| 8,554,714 | B2 | 10/2013 | Raymond et al. | |
| 9,535,570 | B2 * | 1/2017 | Bann | G06F 3/0486 |
| 9,754,478 | B1 * | 9/2017 | Fuller | G05B 15/02 |
| 9,792,589 | B2 * | 10/2017 | Bedingfield, Sr. | G06Q 10/109 |
| 10,127,799 | B2 | 11/2018 | Janchookiat | |
| 10,552,005 | B2 | 2/2020 | Nair et al. | |
| 10,671,028 | B2 | 6/2020 | Nixon et al. | |
| 11,071,003 | B2 | 7/2021 | Liu et al. | |
| 11,087,611 | B1 | 8/2021 | Ji et al. | |
| 11,209,959 | B2 | 12/2021 | Nair et al. | |
| 11,527,145 | B2 * | 12/2022 | Ji | G08B 25/002 |

OTHER PUBLICATIONS

Rothenberg, "Alarm Management," 75 pages, accessed Jun. 4, 2020.
"Pro-Watch Software Suite; Web Interface User Guide", Honeywell, 103 pages, Jan. 2017.
"Experion Industrial Security," Honeywell, 7 pages, Apr. 2013.
"MAXPRO Video Management System R560," Honeywell, 242 pages, 2019.
"Experion LX Operator's Guide," Honeywell, 331 pages, Apr. 2017.

* cited by examiner

METHODS AND SYSTEMS FOR MANAGING EXECUTION OF STANDARD OPERATING PROCEDURES BY AN OPERATOR TO ADDRESS ALARMS GENERATED BY A FACILITY MANAGEMENT SYSTEM

This is a continuation of co-pending U.S. patent application Ser. No. 17/382,714, filed Jul. 22, 2021, which is a continuation of U.S. patent application Ser. No. 16/888,352, filed May 29, 2020, now U.S. Pat. No. 11,087,611, both of which are incorporated herein by reference.

TECHNICAL FIELD

The disclosure relates generally to facility management systems, and more particularly to methods and systems for managing execution of standard operating procedures by an operator to address alarms generated by the facility management systems.

BACKGROUND

Large facility management systems typically include a computer system programmed for processing input from numerous alarm sensors distributed throughout a facility (e.g., an airport, a hospital, a campus, a shopping mall, a group of buildings, an office building, etc.). The alarm sensors are configured to detect troubling events, such as a fire, a card reader failure, HVAC equipment failure or degradation, vandalism, security breaches, and the like. Some alarm sensors are video cameras, wherein the computer system applies video analytics for recognizing troubling events such as vandalism, accidents, trespassing, and the presence of unauthorized individuals.

The alarms are typically displayed on an operator console, often in real time. An operator must typically decide how to effectively address each incoming alarm. It can be difficult for the operator to properly deal with each of the alarms, particularly in a timely manner, when the operator is deluged with a flood of alarms from the facilities management system.

SUMMARY

The present disclosure generally pertains to a computer assisted facility monitoring method for providing a user with predefined operating procedures that are tailored for addressing one or more specific alarms acknowledged by the user. The predefined operating procedures are created and stored prior to the occurrence of the alarms. These predefined operating procedures may be considered Standard Operating Procedures, or SOPs.

In some examples of the disclosure, a facility monitoring method includes displaying a plurality of alarm notifications corresponding to a plurality of troubling events and providing a user with an option for acknowledging at least one of the alarm notifications. In response to the user acknowledging at least one alarm notification, the user is presented with a predefined operating procedure for the acknowledged alarm notification(s). The predefined operating procedure includes at least one recommended action step to address the corresponding troubling event, and the user can then perform the recommended action step(s).

In some examples of the disclosure, a facility monitoring method includes a computer storing a plurality of predefined operating procedures including a first predefined operating procedure with at least one recommended action step for addressing a first troubling event. The computer displays a plurality of alarm notifications corresponding to the plurality of troubling events, and the plurality of alarm notifications includes a first alarm notification for the first troubling event. The computer enables the user to acknowledge at least the first alarm notification. When the user acknowledges the first alarm notification, the computer provides the user with a choice between a first option of proceeding with the first predefined operating procedure and a second option of bypassing the first predefined operating procedure. When the user chooses the first option, the computer presents the user with at least one recommended action step to address the first troubling event. When the user chooses the second option, the first alarm notification is dismissed.

In some examples of the disclosure, facility monitoring method includes storing a plurality of predefined operating procedures including a first predefined operating procedure with a plurality of recommended action steps for addressing a first troubling event. The facility monitoring method displays a plurality of alarm notifications corresponding to the plurality of troubling events, wherein the plurality of alarm notifications includes a first alarm notification for the first troubling event. The user is enabled to acknowledge at least the first alarm notification. When the user acknowledges the first alarm notification, the user is presented with the first predetermined operating procedure along with its plurality of recommended action steps for addressing the first troubling event. The user can clear the first alarm notification when the plurality of recommended action steps have been completed. Alternatively, the user can clear the first alarm notification even if the plurality of recommended action steps are uncompleted, provided the user enters into the computer an explanation as to why the plurality of recommended action steps need not be completed.

In some examples of the disclosure, in response to acknowledging an alarm occurrence, the user may be provided with an option for bypassing or disregarding the alarm, as some such acknowledgements may have been for false alarms.

In some examples of the disclosure, the predefined operating procedure may specify multiple action steps for addressing an alarm. In such examples, the user can close out or settle an alarm incident even without completing all of the action steps, provided the user enters a reason for doing so.

In some examples of the disclosure, the user can check off individual action steps as they are completed, and a progress of completion indicator illustrates how many of the action steps have been completed and how many more still need to be done.

In some examples of the disclosure, a user can batch-select a group of alarms, wherein perhaps only some of the acknowledged alarms in the group have corresponding predefined operating procedures.

The preceding summary is provided to facilitate an understanding of some of the features of the present disclosure and is not intended to be a full description. A full appreciation of the disclosure can be gained by taking the entire specification, claims, drawings and abstract as a whole.

BRIEF DESCRIPTION OF THE DRAWINGS

The disclosure may be more completely understood in consideration of the following description of various illustrative embodiments of the disclosure in connection with the accompanying drawings in which.

Figure 1:
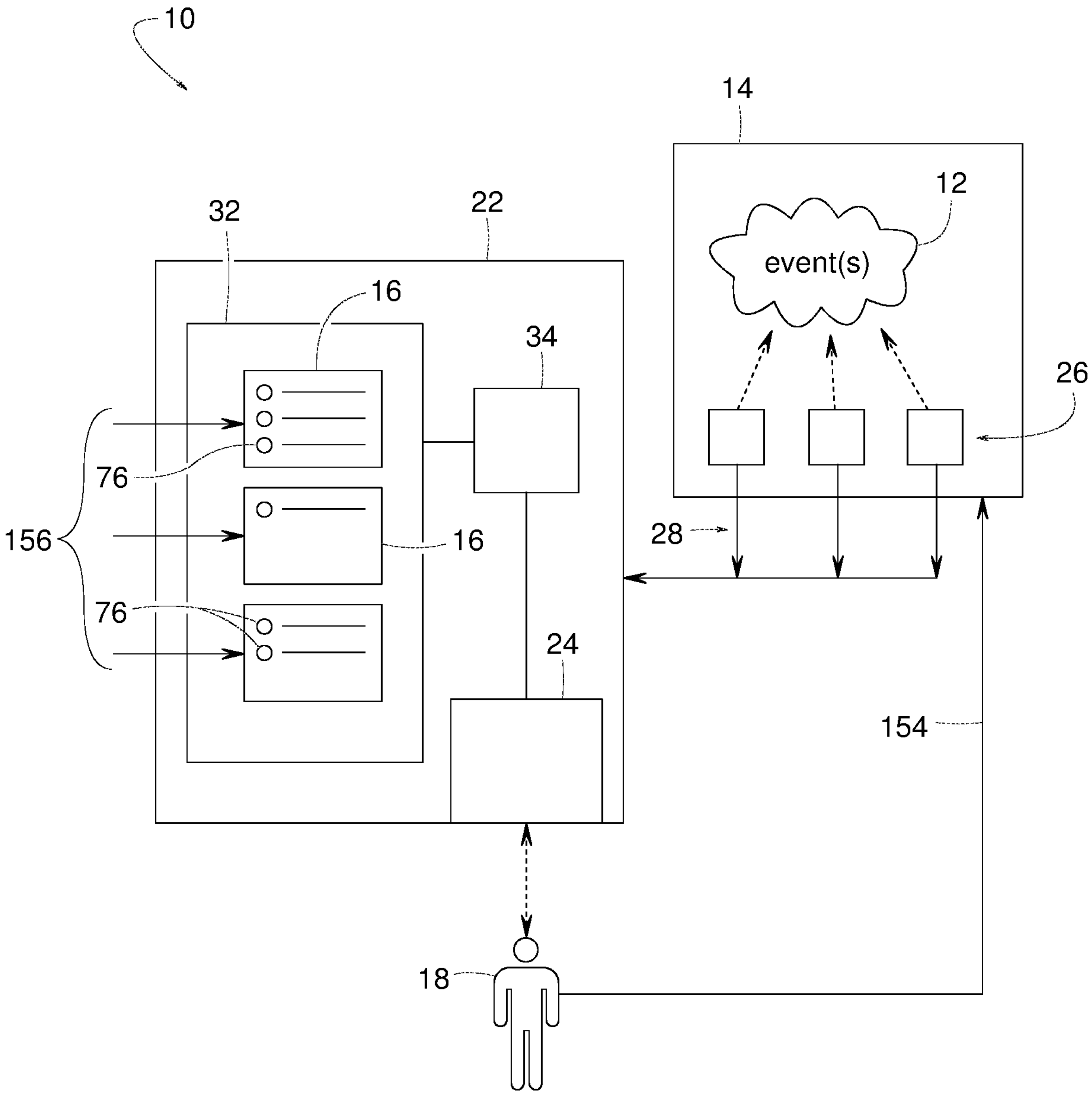
FIG. 1 is a schematic block diagram of an example facility management system.

While the disclosure is amendable to various modifications and alternative forms, specifics thereof have been shown by way of example in the drawings and will be described in detail. It should be understood, however, that the intention is not to limit the disclosure to the particular illustrative embodiments described herein. On the contrary, the intention is to cover all modifications, equivalents, and alternatives falling within the spirit and scope of the disclosure.

DESCRIPTION

The following description should be read with reference to the drawings wherein like reference numerals indicate like elements throughout the several views. The description and drawings show several examples that are meant to be illustrative of the disclosure.

In some examples, the disclosure pertains to a computer assisted facility monitoring method for providing a user with predefined operating procedures that are recommended for addressing one or more alarms acknowledged by the user. The predefined operating procedures are created prior to the occurrence of the alarms. In some examples, after acknowledging an alarm occurrence, the user may be provided with an option for bypassing or disregarding the alarm, as some such acknowledgements may have been for false alarms. In some examples, the predefined operating procedure may specify multiple action steps for addressing an alarm. In such examples, the user can close out or settle an alarm incident even without completing all of the action steps, provided the user gives a valid reason for doing so. In some examples, a user can batch-select a group of alarms, wherein perhaps only some of the acknowledged alarms in the group have corresponding predefined operating procedures. In some examples, the user can check off individual action steps as they are completed, and a progress of completion indicator illustrates how many of the action steps have been completed and how many more still need to be done for each alarm.

FIG. 1 is a schematic diagram illustrating one example of a facility management system 10 for a facility 14. The disclosure uses a facilities management system 10 as an example, which may include an HVAC system, a security system, a fire system, a lighting system, an industrial process control system, and/or any other suitable facility management system. The facility may include a commercial or residential building, a factory, a power plant, an airplane, a ship, or any other suitable facility. It is contemplated that the present disclosure may be applied to any application where alarms are generated and acknowledged by an operator.

The facility management system 10 may implement a facility monitoring method for providing a user 18 with a predefined operating procedure 16 for addressing troubling events 12 that might occur at the facility 14. The term "predefined operating procedure" refers to one or more recommended action steps for addressing a troubling event, wherein the recommended action steps were determined ahead of time, i.e., prior to the occurrence of the troubling event. These predefined operating procedures may be considered Standard Operating Procedures, or SOPs. In this example, facility management system 10 involves the use of a computer system 22, a display 24 associated with computer system 22, and a plurality of sensors 26 for generating alarm signals 28 in response to detecting one or more troubling events 12 at facility 14.

The term "facility" refers to any designated area such as, for example, a part or zone of a building, a single building, a group of buildings, an airport, a campus, a predefined outdoor area, a park, fairgrounds, a worksite, a parking lot, a neighborhood, etc. The term "troubling event" refers to the occurrence of a possible problem of concern at the facility. Some examples of troubling events 12 may include an alarm triggered event, an observed problem, a reported problem, etc. An observed or reported problem can be any troubling event witnessed by someone that verbally or otherwise notifies user 18.

The term "user" refers to one or more people associated with monitoring or addressing the security, safety, maintenance, and/or operation of a facility. Some example users include an operator, a supervisor, an administrator, security personnel, parking attendants, transportation security attendants, and maintenance workers. In some examples, a user comprises two or more individuals, wherein one individual does one action and a second individual does another action.

An alarm triggered event is any occurrence that causes at least one sensor 26 to generate at least one alarm signal 28. Some example sensors 26 for generating alarm signals 28 include a smoke detector, a fire detector, a card reader, a badge reader, a proximity switch, a motion detector, a temperature sensor, a humidity sensor, a current and/or voltage sensor, a microphone, a light sensor, a contact witch, a video camera, etc. Alarm signal 28 is any physical, electrical or visual communication that indicates that something wrong, abnormal or unexpected has occurred. Some examples of alarm-triggered events include a fire, an HVAC degradation or failure, other equipment degradation or failures, a breakage of equipment, an improper use of a door, a badge detection failure, trespassing, theft, vandalism, a security breach, and/or the video detection of an unexpected or unauthorized individual in a certain area.

Computer system 22 is schematically illustrated to represent one or more digital components with a computer readable medium 34 having stored thereon, in a non-transitory state, an executable program code that, when executed, causes certain intended physical outcomes. Some examples of such physical outcomes include displaying information on display 24 (e.g., one or more computer monitors), receiving and processing input alarm signals 28, and responding to input from user 18 via mouse-clicks, keyboard entries, touchscreen inputs, etc.

The term, "computer readable medium" refers to any device for storing information for any duration (e.g., for extended time periods, permanently, for brief instances, for temporarily buffering, for caching of the information, etc). The term, "program code" refers to executable instructions (e.g., computer readable instruction, machine readable instructions, software, etc.). The term, "non-transitory computer readable medium" is specifically defined to include any type of computer readable storage device and/or storage disk and to exclude propagating signals and to exclude transmission media.

In some examples, computer system 22 may include a memory 32 for storing predefined operating procedures 16. In some examples, one or more portions of memory 32 and/or other portions of computer system 22 may be remotely located but accessible through an internet connection or through some other known communication link.

Figure 6:
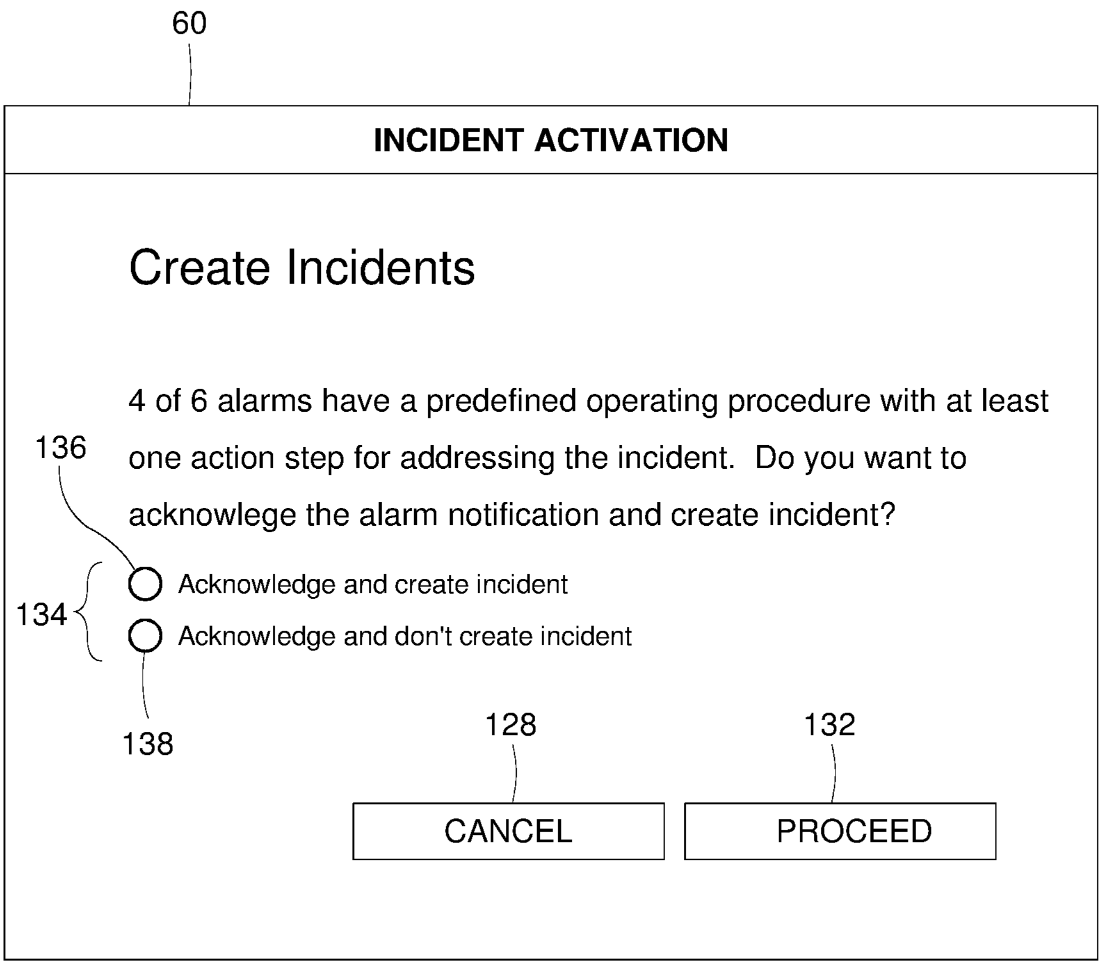
FIG. 6 is a view of an example Incident Activation window of a facility monitoring method.
Figure 7:
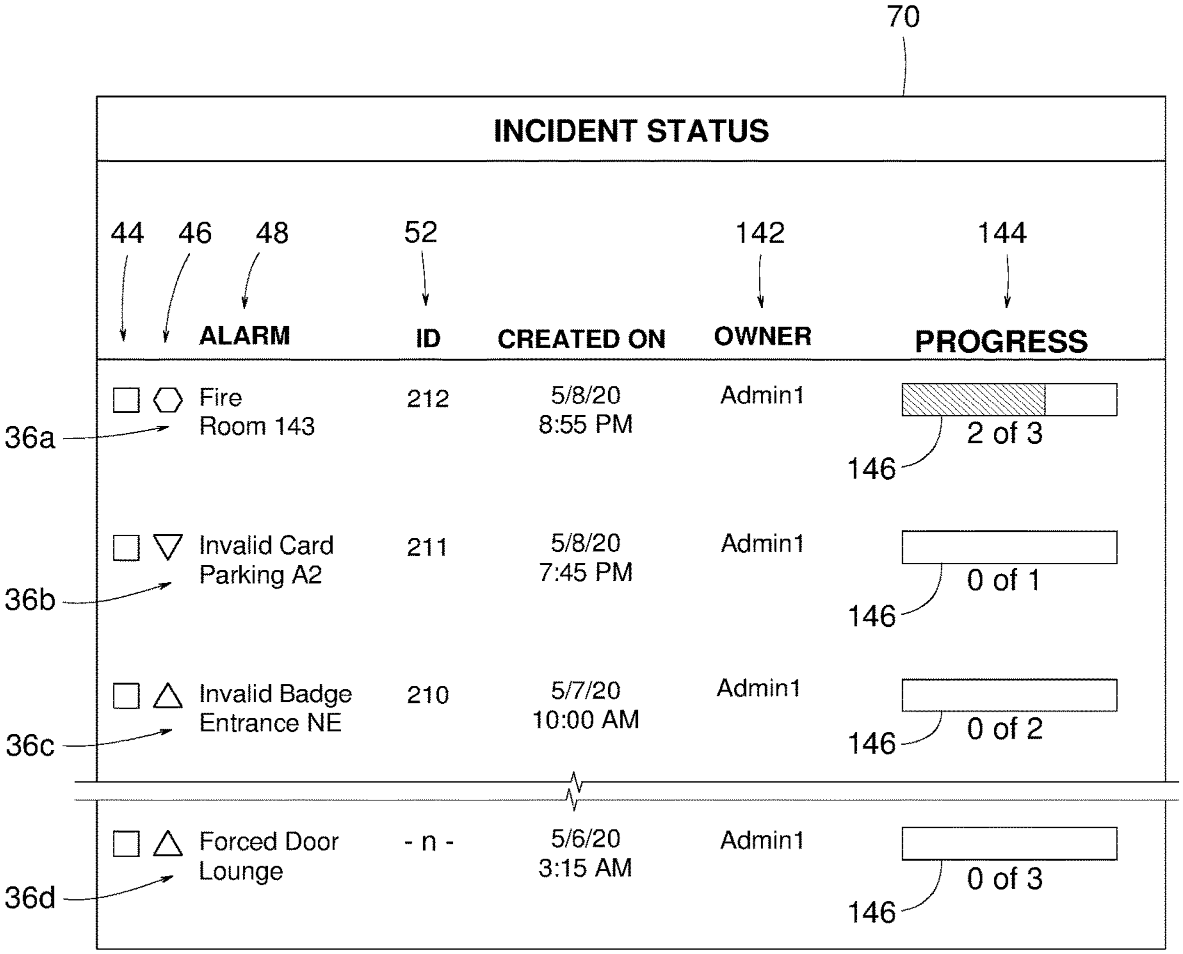
FIG. 7 is a view of an example Incident Status window of a facility monitoring method.
Figure 8:
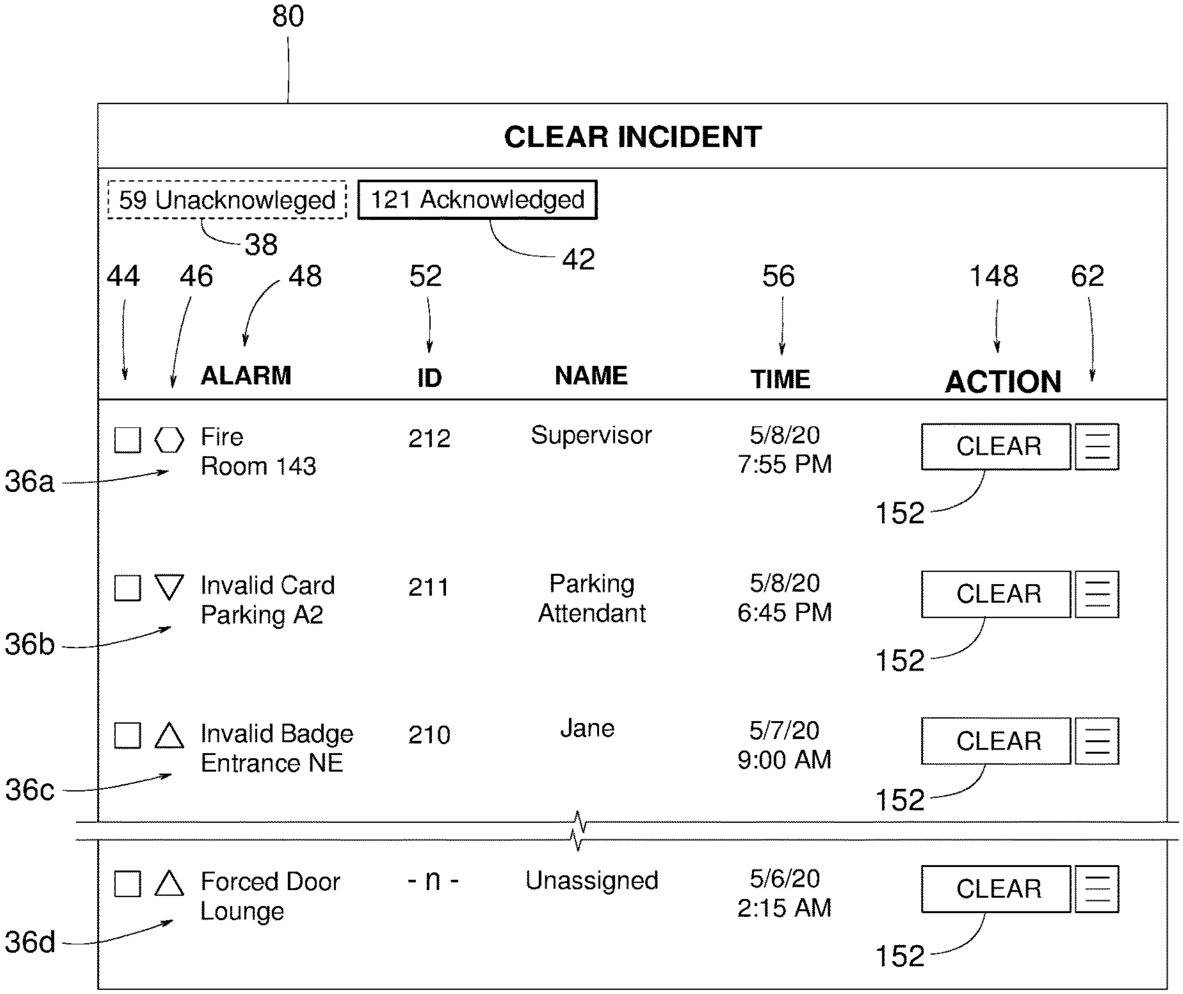
FIG. 8 is a view of an example Clear Incident screen of a facility monitoring method.

In some examples of facility management system 10, computer system 22 controls display 24 to provide user 18 with various informative and/or interactive screens and popup windows, such as those shown in FIGS. 2-8. Some examples may include an Alarm Acknowledgement screen 20 (FIG. 2), an Incident Action screen 30 (FIG. 3), an Incident Dismissal window 40 (FIG. 4), an Incident Confirmation window 50 (FIG. 5), an Incident Activation window 60 (FIG. 6), an Incident Status window 70 (FIG. 7), and a Clear Incident screen 80 (FIG. 8). In some examples, one or more screens/windows 20, 30, 40, 50, 60, 70, and 80 may include navigation tabs that enable user 18 to switch from one screen/window to another, in any order.

Figure 2:
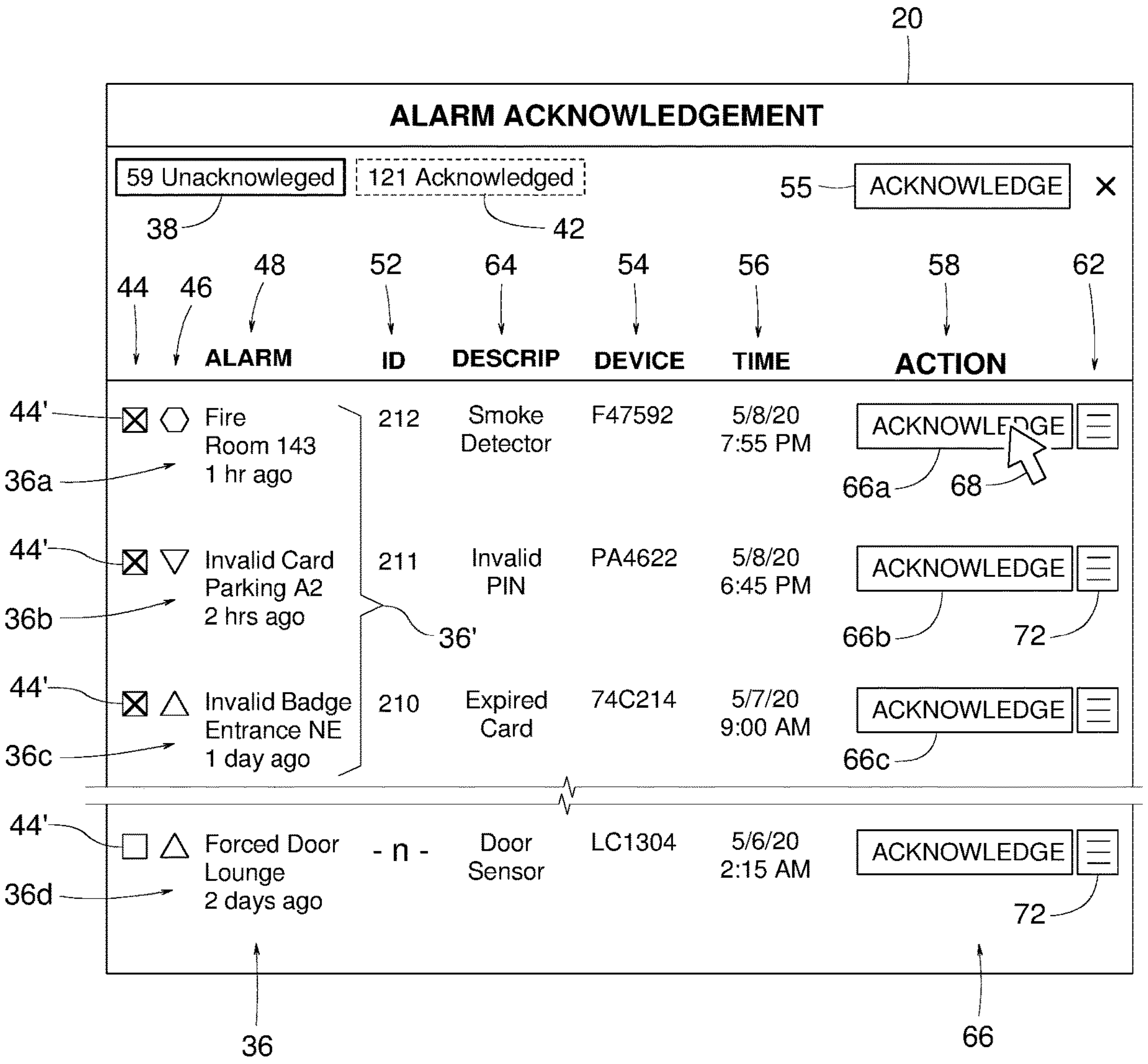
FIG. 2 is a view of an example Alarm Acknowledgement screen of a facility monitoring method.

In the example illustrated in FIG. 2, Alarm Acknowledgement screen 20 happens to show four alarm notifications 36 (alarm notifications **36*a*, 36*b*, 36*c*, and 36*d*); however, any number of alarm notifications 36 can be presented. The term, "alarm notification" refers to any message or identifier indicating the occurrence of an alarm-triggered event or some other troubling event. In the illustrated example, each alarm notification 36** may provide a brief description of the alarm, its general location, and approximate time of occurrence.

In some examples, Alarm Acknowledgement screen 20 may include an Unacknowledged button 38, an Acknowledged button 42, a checkbox column 44, a priority rank column 46, an Alarm column 48, an ID column 52, a Device column 54, a Time column 56, an Action column 58, a group Acknowledge button 55, and an options column 62. Alarm column 48 provides a list of alarm notifications 36. Priority rank column 46 provides a symbol at each alarm notification 36 to indicate its level of priority, importance, or urgency. For instance, in some examples, a hexagon might identify alarms with the highest level of priority, a triangle pointing up might represent a moderate priority, and a triangle pointing down might represent a relatively low priority.

ID column 52 provides each alarm with an assigned identification or serial number. Those same identification numbers can be used in other screens and windows to help quickly identify which alarms are being evaluated, processed or otherwise referenced A Description column 64 may provide each alarm with additional descriptive information. Alarm column 48, for example, includes a Fire alarm notification for a fire in Room 143, while Description column 64 may point out that a smoke detector is what triggered the alarm. Device column 54 may provide even more specific information, e.g., the smoke detector has a device identification number of F47592. Time column 56 indicates the date and time of when the alarm occurred.

Action column 58 provides a set of Acknowledge buttons 66 for a corresponding set of alarm notifications 36 in Alarm column 48. Each Acknowledge button 66 provides user 18 with a way for acknowledging a corresponding alarm notification 36. The term "acknowledge" (and derivatives thereof), as it pertains to a user acknowledging a computer displayed alarm notification means that the user physically performed some sort of computer related input action directed to the displayed alarm notification. Some examples of such an input action may include selecting or highlighting one or more computer displayed elements, such as checkboxes, words, descriptions, numbers, symbols, boxes, buttons, objects, icons, and/or combinations thereof; wherein the selecting or highlighting action may be done via a mouse (e.g., mouse-clicking 68), keyboard, touchscreen, and/or verbal input.

Each Acknowledge button 66 directly acknowledges a corresponding individual alarm notification 36. Mouse-clicking or otherwise selecting an individual Acknowledge button 66 automatically issues an incident with a predefined operating procedure 16. More specifically, in some examples, user 18 acknowledges alarm notification **36*a* (Fire in Room 143) by mouse-clicking 68 (or using a touchscreen, etc.) on Acknowledge button 66*a*. Likewise, user 18 can acknowledge alarm notification 36*b* (Invalid Card in Parking A2) by mouse-clicking on Acknowledge button 66*b***.

Acknowledged button 42 and Unacknowledge button 38 may provide user 18 with a way for toggling between Alarm Acknowledgement screen 20 (FIG. 2) and Clear Incident screen 80 (FIG. 8). Clear Incident screen 80 will be explained later.

Figure 3:
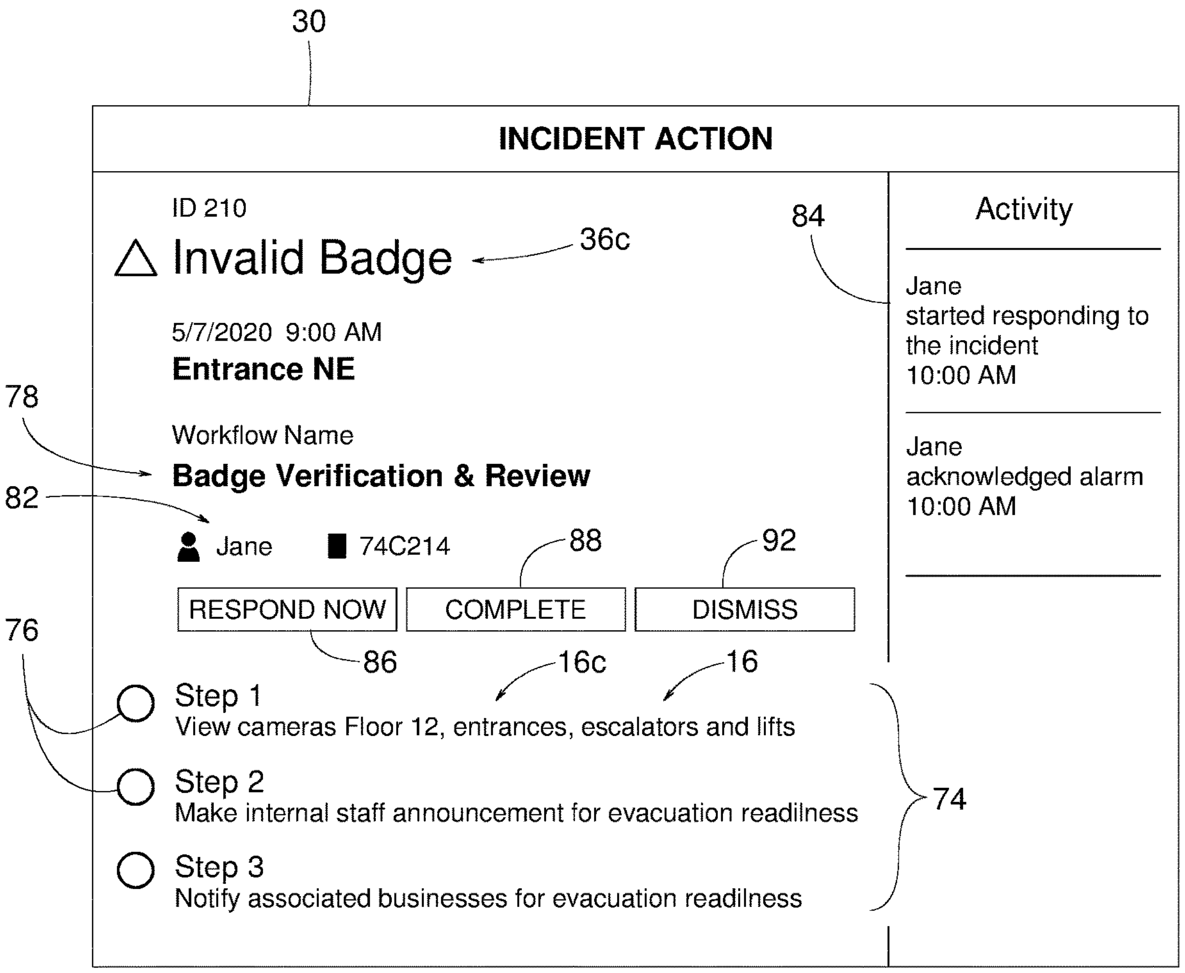
FIG. 3 is a view of an example Incident Action screen of a facility monitoring method.

For sake of example, in Alarm Acknowledgement screen 20, user 18 might mouse-click or otherwise select Acknowledge button **66*c* to acknowledge alarm notification 36*c* (Invalid Badge, ID 210). In response to this user acknowledgement, user 18 is automatically presented with Incident Action screen 30 (FIG. 3). In this example, Incident Action screen 30 provides user 18 with a predefined operating procedure 16*c* with one or more recommended action steps 74 for addressing acknowledged alarm notification 36*c* (Invalid Badge, ID 210). Some examples of Incident Action screen 30 include symbols 76 (e.g., checkboxes, circles, buttons, etc.) that enable user 18 to mark individual action steps 74** as being completed.

Incident Action screen 30, in this particular example, may confirm or repeat some of the same information found on Alarm Acknowledgement screen 20 as it pertains to an acknowledged alarm notification 36, such as, for example, alarm notification **36*c* (Invalid Badge, ID 210). In some examples, Incident Action screen 30 may also provide a Workflow Name 78, an identification 82 of a user 18 assigned to the incident, an Activity log 84, a Respond Now button 86, a Complete button 88, and a Dismiss button 92**.

User 18 can mouse-click or otherwise select the Respond Now button 86, which may assign a chosen user 18 (e.g., Jane) to the alarm. In this particular example, Jane then performs the list of recommended action steps 74 either directly herself and/or with the assistance of others. Symbols 76 allow Jane to record her progress by marking the completion of individual action steps 74, and the progress of the response is recorded in Activity log 84.

When all of the action steps 74 have been completed and/or the alarm associated with alarm notification **36*c* has been resolved, user 18 can mouse-click or otherwise select the Complete button 88. If all of the action steps 74 have been completed, as indicated by all of the symbols 76 being checked, selecting the Complete button 88 ends the process of responding to alarm notification 36*c*. If, however, Complete button 88 is selected while symbols 76 indicate that not all of the action steps 74 have been completed, then Incident Dismissal window 40 (FIG. 4**) appears.

Incident Dismissal window 40 provides a textbox 94 that offers user 18 with an opportunity to enter a reason for dismissing an alarm notification 36 (e.g., dismissing alarm notification 36*c*). After entering a reason for dismissal, user 18 may confirm the dismissal by mouse-clicking or otherwise selecting a Dismiss Incident button 96. Selecting the Dismiss Incident button 96 ends the process of responding to alarm notification 36*c*.

If, however, user 18 decides not to Dismiss Incident after all, user 18 can select a Back to Incident button 98. Back to Incident button 98 returns user 18 to Incident Action screen 30 (FIG. 3). This allows user 18 to continue working on the predefined operating procedure 16 for alarm notification 36*c*.

Figure 5:
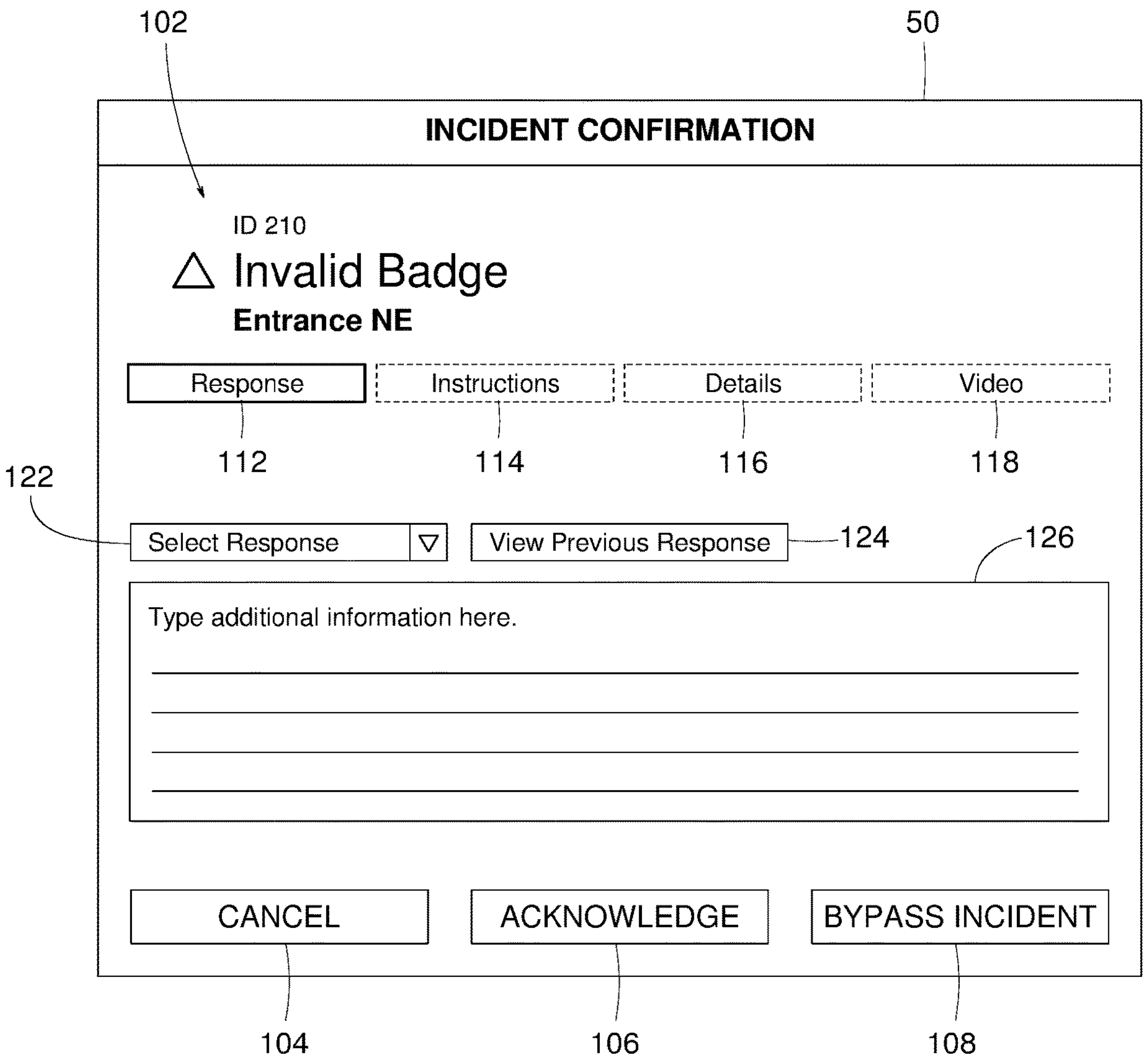
FIG. 5 is a view of an example Incident Confirmation window of a facility monitoring method.

Returning to FIG. 2, in some examples, rather than using acknowledge buttons 66 for acknowledging alarm notifications 36 and thereby automatically creating an incident directly, user 18 may confirm a selected alarm notification 36 by instead mouse-clicking or otherwise selecting a corresponding options icon 72 in options column 62. This leads to Incident Confirmation window 50 (FIG. 5). Incident Confirmation window 50 provides more flexible options when user 18 acknowledges or otherwise handles a chosen alarm in this manner.

In some examples, Incident Confirmation window 50 may display incident information 102 (e.g., Invalid Badge, ID 210, level of priority, etc.) and may provide user 18 with options for mouse-clicking or otherwise selecting a Cancel button 104, an Acknowledge button 106, and a Bypass Incident button 108. Acknowledge button 106 (first option) confirms the acknowledgement of the subject alarm notification 36 (e.g., alarm notification 36*c*, Invalid Badge, ID 210) and then, in some examples, presents Incident Action screen 30 (FIG. 3) to user 18. In addition or alternatively, in some examples, Acknowledge button 106 leads user 18 to Incident Activation screen 60 (FIG. 6). User 18 mouse-clicking or otherwise selecting Bypass Incident button 108 (second option) dismisses or clears the subject alarm notification 36*c*, whereby the troubling event 12 associated with alarm notification 36*c* is considered to have been resolved, and alarm notification 36*c* is deemed no longer valid or active. Cancel button 104 returns user 18 to Alarm Acknowledgement screen 20 (FIG. 2) and gives user 18 the opportunity to confirm or change the user's previous action taken in Alarm Acknowledgement screen 20.

In some examples, Incident Confirmation window 50 provides additional information and/or options. For instance, in the example shown in FIG. 5, Incident Confirmation window 50 may provide a Response tab 112 for displaying what is shown in FIG. 5, an Instructions tab 114 for displaying instructions regarding alarm notification 36*c*, a Details tab 116 for more specific information about alarm notification 36*c*, and perhaps a Video tab 118 for any relevant videos regarding alarm notification 36*c* and its associated troubling event 12.

In the illustrated example, Incident Confirmation window 50 may also provide a Select Response button 122, a View Previous Response button 124, and a textbox 126. Select Response button 122 may provide a dropdown menu of one or more predefined responses or predefined operating procedures for addressing the subject alarm notification 36*c*. View Previous Response button 124 may provide user 18 with prior responses to alarm notification 36*c*. And textbox 126 is for user 18 to enter and document any relevant additional information.

In some examples, instead of acknowledging alarm notifications 36 individually through acknowledgement buttons 66 or options icons 72, user 18 may select multiple checkboxes 44' to collectively acknowledge a batch of alarm notifications 36' (e.g., alarm notifications 36*a*, 36*b*, and 36*c*). After selecting the batch of alarm notifications 36', user 18 may click on group acknowledgment button 55 (FIG. 2). This leads to Incident Activation window 60 (FIG. 6).

In some examples, Incident Activation window 60 may provide information as to how many of the alarms selected in Alarm Acknowledgement screen 20 have a predefined operating procedure 36. In addition or alternatively, some examples of Incident Activation window 60 may provide user 18 with a Cancel button 128, a Proceed button 132, and a choice 134 between two mutually exclusive selectable (e.g., mouse-clickable) elements 136 and 138. User 18 choosing element 136 (first option) acknowledges one or more alarm notifications and creates one or more incidents, which applies one or more predefined operating procedures 36 to the corresponding one or more alarm notifications 36. User 18 choosing element 138 (second option) acknowledges one or more alarm notifications but does not create any incidents for them, thus the troubling events 12 associated with alarm notifications 36 will still need to be addressed but without necessarily the benefit of any predefined operating procedures 16. User 18 mouse-clicking or otherwise selecting Proceed button 132 enacts or confirms the user's choice of element 136 or 138. User 18 mouse-clicking or otherwise selecting Cancel button 128 may return user 18 to a previous window or screen, such as Alarm Acknowledgement screen 20.

In some examples, selecting Proceed button 132 of Incident Activation window 60 may lead user 18 to Incident Action screen 30 or Incident Status window 70. In some examples, Incident Status window 70 may include Alarm column 48, an Owner column 142 and a Progress column 144. Owner column 142 may identify one or more users 18 responsible for addressing troubling events 12 associated with alarm notifications 36. In the illustrated example, Progress column 144 provides one or more progress of completion indicators 146 that illustrate how many recommended actions steps 74 have been completed for each alarm notification 36 in Alarm column 48. In some examples, mouse-clicking or otherwise selecting an alarm notification 48 and/or its corresponding progress of completion indicator 146 may lead user 18 back to Incident Action screen 30 (FIG. 3).

Figure 4:
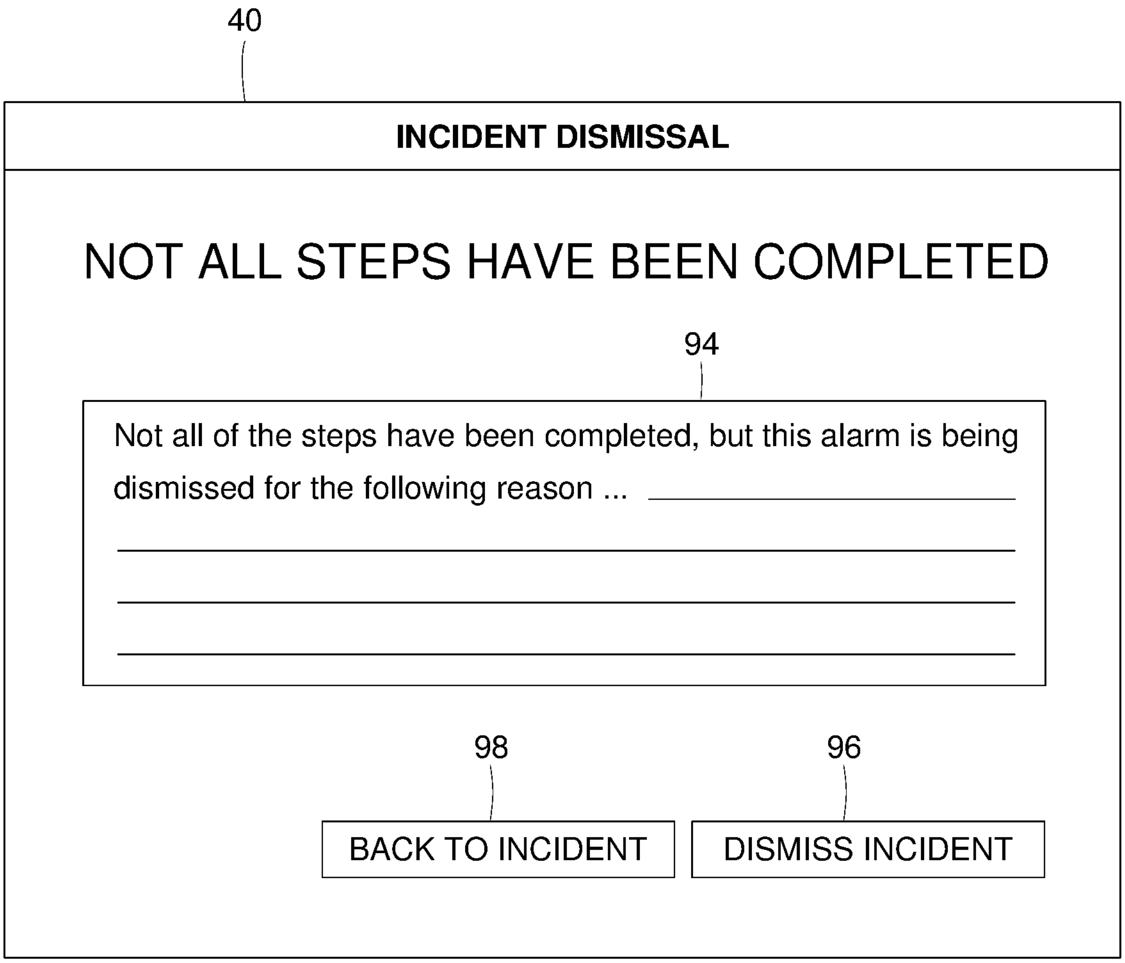
FIG. 4 is a view of an example Incident Dismissal window of a facility monitoring method.

If all of the action steps 74 of an alarm notification 36 have been completed, as indicated by the progress of completion indicator 146, then mouse-clicking or otherwise selecting Complete button 88 on Incident Action screen 30 may close out and clear that alarm notification 36. If, however, one or more of the action steps 74 are not completed, as indicated by the progress of completion indicator 146, then mouse-clicking or otherwise selecting Dismiss button 92 on Incident Action screen 30 may lead user 18 to Incident Dismissal window 40 (FIG. 4).

As mentioned earlier, Incident Dismissal window 40 provides textbox 94 for entering a reason for dismissing an alarm notification 36. After entering a reason for dismissal in textbox 94, user 18 may confirm the dismissal by mouse-clicking or otherwise selecting Dismiss Incident button 96 of Incident Dismissal window 40. Selecting the Dismiss Incident button 96 ends the process of responding to the subject alarm notification 36. In some examples, user 18 might select Dismiss Incident button 96 simply because the incident is getting old and may have resolved itself without ongoing user intervention.

Referring back to Alarm Acknowledgement screen 20 (FIG. 2) and Clear Incident screen 80 (FIG. 8), those two screens 20 and 80 each include Acknowledged button 42 and Unacknowledge button 38. Buttons 38 and 42 for provide user 18 with a way to toggle between Alarm Acknowledgement screen 20 and Clear Incident screen 80.

In the illustrated example, Clear Incident screen 80 includes an Action column 148 with a series of Clear buttons 152. Mouse-clicking or otherwise selecting one or more Clear buttons 152 may provide user 18 with a way for clearing, silencing or resetting a sensor 26 without necessarily dismissing the alarm notification 36 associated with the corresponding sensor 26. In some examples, selecting one or more Clear buttons 152 may lead user 18 back to Incident Dismissal window 40 (FIG. 4). In Incident Dismissal window 40, user 18 may fully dismiss the incident associated with the alarm cleared in the Clear Incident screen 80 (FIG. 8). In some examples, Clear Incident screen 80 provides popup messages indicating whether a selecting a Clear button 152 was successful or unsuccessful based on whether an incident had any outstanding, uncompleted action steps 74.

Various steps of operating the facility management system 10 are illustrated in FIGS. 1-8 as follows. Alarm Acknowledgement screen 20 is one example illustration of displaying a plurality of alarm notifications 36 corresponding to the plurality of troubling events 12. Acknowledgement buttons 66 of FIG. 2 is one example illustration of providing user 18 with an option for acknowledging at least one alarm notification (e.g., alarm notification 36*c*) of the plurality of alarm notifications 36. User 18 mouse-clicking 68 on an Acknowledge button 66 in FIG. 2 is one example illustrating that in response to user 18 acknowledging the at least one alarm notification 36 (e.g., via Acknowledge button 36*a*, 36*b*, 36*c*, or 36*d*), presenting user 18 (e.g., via Incident Action screen 30 of FIG. 3) with predefined operating procedure 16 for the at least one alarm notification 36 acknowledged by user 18, wherein FIG. 3 shows the predefined operating procedure 16 includes at least one recommended action step 74 to address the corresponding troubling event 12 shown in FIG. 1. An arrow 154 of FIG. 1 represents user 18 performing at least one recommended action step 74 to address the corresponding troubling event 12.

Arrows 156 and memory 32 of FIG. 1 represent creating and storing predefined operating procedure 16 before the plurality of troubling events 12 occur. Checkboxes 44 and options icons 72 shown in FIG. 2 represents providing user 18 with a batch-select option for acknowledging a batch of alarm notifications 36' of the plurality of alarm notifications 36, wherein the batch of alarm notifications 36' are a subset of the plurality of alarm notifications 36, and the batch of alarm notifications 36' includes the at least one alarm notification 36*c*. Multiple viewings of Incident Action screen 30, shown in FIG. 3, is one example illustrating that in response to user 18 choosing and exercising the batch-select option (shown in FIG. 2), presenting user 18 with a plurality of predefined operating procedures 16 corresponding to the batch of alarm notifications 36'. Bypass Incident button 108 of FIG. 5 represents providing user 18 with a bypass option for allowing user 18 to cancel a false alarm notification (possibly any one of alarm notifications 36 after first acknowledging the false alarm notification, e.g., via option icons 72) without presenting user 18 with a predefined operating procedure 16 for the false alarm notification (e.g., going from Alarm Acknowledgement screen 20 to Incident Confirmation window 50 without first going to Incident Action screen 30). Symbols 76 (FIG. 3) represent enabling user 18 to mark an individual action step of the plurality of recommended action steps as being completed. FIG. 7 illustrates displaying progress of completion indicator 146 that shows how many of the plurality of recommended actions steps have been performed. FIGS. 3, 7 and 8 illustrate examples of displaying an identifier (e.g., Jane, Admin1, Supervisor, etc.) of a user responsible for performing the at least one recommended action step.

Acknowledge button 106 (first option) and Bypass Incident button 108 (second option), both shown in FIG. 5, illustrate that when the user acknowledges the first alarm notification, providing the user, via the computer, with a choice between a first option of proceeding with the first predefined operating procedure and a second option of bypassing the first predefined operating procedure. The action steps shown in FIG. 3 illustrate that when the user chooses the first option, presenting the user, via the computer, with the at least one recommended action step to address the first troubling event. Bypass Incident button 108 in FIG. 5 illustrates that when the user chooses the second option, dismissing the first alarm notification via the computer. Clear buttons 152 in FIG. 8 illustrate enabling the user to clear alarm notifications. Textbox 94 of FIG. 4 represents enabling the user to enter into the computer a reason or explanation as to why some of the recommended action steps need not be completed, and the horizontal lines in textbox 94 represent the user actually entering the text.

Some example methods for operating facility management system 10 can be defined as follows:

Example-1 A facility monitoring method for assisting a user in addressing a plurality of troubling events at a facility being monitored, the method comprising:

displaying a plurality of alarm notifications corresponding to the plurality of troubling events;

associating a plurality of predefined operating procedures with only some of the plurality of alarm notifications, each predefined operating procedure of the plurality of predefined operating procedures includes at least one recommended action step for addressing at least one of the plurality of troubling events; and enabling the user to collectively acknowledge a batch of alarm notifications of the plurality of alarm notifications, the batch of alarm notifications being a subset of the plurality of alarm notifications, and only a portion of the batch of alarm notifications are associated with the plurality of predefined operating procedures.

Example-2 A facility monitoring method with a computer for assisting a user in addressing at least a first troubling event and a second troubling event of a plurality of troubling events at a facility being monitored, the method comprising:

displaying a plurality of alarm notifications corresponding to the plurality of troubling events, wherein the plurality of alarm notifications includes at least a first alarm notification and a second alarm notification, the first alarm notification being associated with a first predefined operating procedure with a plurality of recommended action steps for addressing the first troubling event, the second alarm notification being for the second troubling event;

enabling the user to collectively acknowledge a batch of alarm notifications including the first alarm notification and the second alarm notification;

presenting the user with the first predetermined operating procedure including the plurality of recommended action steps for addressing the first troubling event;

enabling the user to clear the first alarm notification when the plurality of recommended action steps have been completed; and enabling the user to clear the second alarm notification regardless of whether the user performed any action to address the second troubling event.

The disclosure should not be considered limited to the particular examples described above. Various modifications, equivalent processes, as well as numerous structures to which the disclosure can be applicable will be readily apparent to those of skill in the art upon review of the instant specification.

What is claimed is:

1. A non-transitory computer readable medium storing instructions that when executed by one or more processors cause the one or more processors to:

accept an indication of a troubling event;

display an alarm notification corresponding to the received troubling event on a display of a user interface;

display on the display two or more available acknowledgement options for acknowledging the alarm notification;

accept from a user a selection of one of the two or more available acknowledgement options via the user interface;

in response to receiving the selection from the user of a first acknowledgement option of the two or more available acknowledgement options, acknowledge the alarm notification and associate a predefined operating procedure with the alarm notification for completion by the user, wherein the predefined operating procedure includes at least one recommended action step to address the corresponding troubling event; and in response to receiving a selection from the user of a second acknowledgement option of the two or more available acknowledgement options, acknowledge the alarm notification without associating the predefined operating procedure with the alarm notification.

2. The non-transitory computer readable medium of claim 1, wherein the instructions define the predefined operating procedure.

3. The non-transitory computer readable medium of claim 1, wherein the instructions cause the one or more processors to:

in response to receiving a selection from the user of the second acknowledgement option of the two or more available acknowledgement options, acknowledge the alarm notification without associating the predefined operating procedure with the alarm notification, and dismiss and/or clear the alarm notification.

4. The non-transitory computer readable medium of claim 1, wherein the instructions cause the one or more processors to:

after receiving a selection from the user of the first acknowledgement option of the two or more available acknowledgement options, receive an indication of progress of completion of the predefined operating procedure by the user; and display a progress of completion indicator on the display that indicates the progress of completion of the predefined operating procedure by the user.

5. The non-transitory computer readable medium of claim 4, wherein the instructions cause the one or more processors to:

receiving from a user via the user interface an indication of completion of each of one or more of the recommended action steps of the predefined operating procedure.

6. The non-transitory computer readable medium of claim 1, wherein the instructions cause the one or more processors to:

accept an indication of each of a plurality of troubling events;

display on the display of the user interface a plurality of alarm notifications each corresponding to one of the plurality of received troubling events;

display on the display an alarm notification selector for selecting a selected batch of two or more of the plurality of alarm notifications;

display a batch-select option on the display for batch acknowledging the selected batch of two or more of the plurality of alarm notifications; and in response to the user choosing and exercising the batch-select option via the user interface, batch acknowledge the selected batch of two or more of the plurality of alarm notifications.

7. The non-transitory computer readable medium of claim 6, wherein the instructions cause the one or more processors to:

in response to receiving a selection from the user of the first acknowledgement option of the two or more available acknowledgement options after choosing the batch-select option, acknowledge the selected batch of two or more of the plurality of alarm notifications and associate a corresponding predefined operating procedure with each of the alarm notifications of the selected batch of two or more of the plurality of alarm notifications; and in response to receiving a selection from the user of the second acknowledgement option of the two or more available acknowledgement options after choosing the batch-select option, acknowledge the selected batch of two or more of the plurality of alarm notifications without associating a corresponding predefined operating procedure with each of the alarm notifications of the selected batch of two or more of the plurality of alarm notifications.

8. The non-transitory computer readable medium of claim 1, wherein the troubling event is detected by one or more sensors of a facility management system.

9. The non-transitory computer readable medium of claim 1, wherein the troubling event is detected by at least one of a person and a camera observing the corresponding troubling event.

10. A system for assisting a user in addressing one or more troubling events at a facility, the system comprising:

a computer system including:

a user interface with a display;

an input for receiving an indication of a troubling event at the facility;

the computer system configured to:

display an alarm notification corresponding to the received troubling event on the display;

display two or more available acknowledgement options for acknowledging the alarm notification on the display;

accept from a user a selection of one of the two or more available acknowledgement options via the user interface;

in response to receiving the selection from the user of a first acknowledgement option of the two or more available acknowledgement options, acknowledge the alarm notification and associate a predefined operating procedure with the alarm notification for completion by the user, wherein the predefined operating procedure includes at least one recommended action step to address the corresponding troubling event; and in response to receiving the selection from the user of a second acknowledgement option of the two or more available acknowledgement options, acknowledge the alarm notification without associating the predefined operating procedure with the alarm notification.

11. The system of claim 10, wherein the computer system is configured to:

in response to receiving the selection from the user of the second acknowledgement option of the two or more available acknowledgement options, acknowledge the alarm notification without associating the predefined operating procedure with the alarm notification, and dismiss and/or clear the alarm notification.

12. The system of claim 10, wherein the computer system is configured to:

after receiving the selection from the user of the first acknowledgement option of the two or more available acknowledgement options, receive an indication of progress of completion of the predefined operating procedure by the user; and display a progress of completion indicator on the display that indicates the progress of completion of the predefined operating procedure by the user.

13. The system of claim 10, wherein the computer system is configured to:

receive an indication of each of a plurality of troubling events at the facility via the input;

display on the display of the user interface a plurality of alarm notifications each corresponding to one of the plurality of received troubling events;

display on the display an alarm notification selector for selecting a selected batch of two or more of the plurality of alarm notifications;

display a batch-select option on the display for batch acknowledging the selected batch of two or more of the plurality of alarm notifications; and in response to the user choosing and exercising the batch-select option via the user interface, batch acknowledge the selected batch of two or more of the plurality of alarm notifications.

14. The system of claim 13, wherein the computer system is configured to:

in response to receiving a selection from the user of the first acknowledgement option of the two or more available acknowledgement options after choosing the batch-select option, acknowledge the selected batch of two or more of the plurality of alarm notifications and associate a corresponding predefined operating procedure with each of the alarm notifications of the selected batch of two or more of the plurality of alarm notifications; and in response to receiving a selection from the user of the second acknowledgement option of the two or more available acknowledgement options after choosing the batch-select option, acknowledge the selected batch of two or more of the plurality of alarm notifications without associating a corresponding predefined operating procedure with each of the alarm notifications of the selected batch of two or more of the plurality of alarm notifications.

15. A system for assisting a user in addressing a plurality of troubling events at a facility, the system comprising:

a computer system including:

a user interface with a display;

an input for receiving an indication of a plurality of troubling events at the facility;

the computer system configured to:

receive an indication of each of the plurality of troubling events at the facility via the input;

display on the display of the user interface a plurality of alarm notifications each corresponding to one of the plurality of received troubling events;

display on the display an alarm notification selector for selecting a selected batch of two or more of the plurality of alarm notifications;

display a batch-select option on the display for batch acknowledging the selected batch of two or more of the plurality of alarm notifications; and in response to the user choosing and exercising the batch-select option via the user interface, batch acknowledge the selected batch of two or more of the plurality of alarm notifications.

16. The system of claim 15, wherein the computer system is configured to:

in response to the user choosing and exercising the batch-select option via the user interface:

batch acknowledge the selected batch of two or more of the plurality of alarm notifications; and associate a corresponding predefined operating procedure with each of the alarm notifications of the selected batch of two or more of the plurality of alarm notifications.

17. The system of claim 15, wherein the computer system is configured to:

display on the display two or more available acknowledgement options for acknowledging the selected batch of two or more of the plurality of alarm notifications;

accept from a user a selection of one of the two or more available acknowledgement options via the user interface;

in response to receiving the selection from the user of a first acknowledgement option of the two or more available acknowledgement options, acknowledge each of the alarm notifications of the selected batch of two or more of the plurality of alarm notifications and associate a corresponding predefined operating procedure with each of the alarm notifications of the selected batch of two or more of the plurality of alarm notifications, wherein the predefined operating procedures include at least one recommended action step to address the corresponding troubling event; and in response to receiving a selection from the user of a second acknowledgement option of the two or more available acknowledgement options, acknowledge each of the alarm notifications of the selected batch of two or more of the plurality of alarm notifications without associating the corresponding predefined operating procedure with the alarm notifications of the selected batch of two or more of the plurality of alarm notifications.

18. The system of claim 15, wherein the computer system is configured to:

track a progress of completion of each of the predefined operating procedures for the alarm notifications of the selected batch of two or more of the plurality of alarm notifications that have an associated predefined operating procedure; and display a progress of completion indicator on the display that indicates the progress of completion of each of the predefined operating procedures for the alarm notifications of the selected batch of two or more of the plurality of alarm notifications that have an associated predefined operating procedure.

19. The system of claim 15, wherein at least some of the plurality of troubling events are detected by one or more sensors of a facility management system.

20. The system of claim 15, wherein at least some of the plurality of troubling events are detected by at least one of a person and a camera observing the corresponding troubling event.

* * * * *